Aug. 6, 1940.                D. L. DERROM                2,210,482
                              ROTARY KILN
                          Filed Jan. 11, 1937
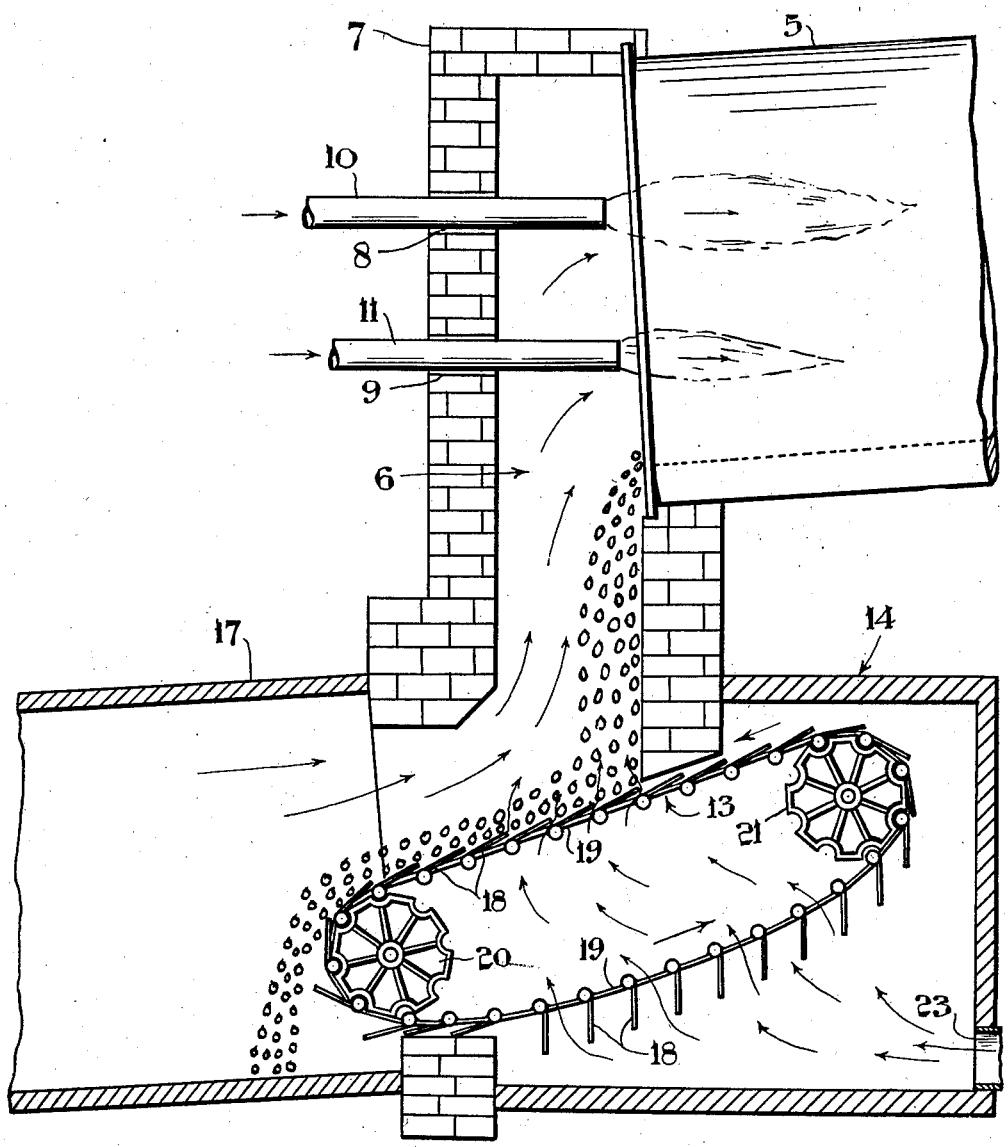
INVENTOR
D. L. DERROM
BY *J. D. O'Connell*
ATTORNEY Patented Aug. 6, 1940

2,210,482

UNITED STATES PATENT OFFICE 2,210,482

ROTARY KILN

Donald L. Derrom, Sao Paulo, Brazil

Application January 11, 1937, Serial No. 120,001

3 Claims. (Cl. 263—53)

This invention relates to the burning of cement or similar materials in a rotary kiln and comprises an improved method and apparatus whereby the heat energy stored within the clinker discharged from the kiln is reclaimed and returned to the clinkering zone in a more efficient manner so that the heat and temperature conditions required in this zone are obtained with the expenditure of less fuel than is ordinarily required for this purpose.

The calcining of the raw materials in cement burning is an endothermic reaction which takes place slowly at a comparatively low temperature and requires a large volume of heat. Clinkering, on the other hand, is now generally recognized to be an exothermic reaction requiring the application of little, if any, heat beyond that necessary to compensate for heat losses due to radiation and other causes. When these reactions are carried out in a single rotary kiln it is necessary that a large volume of heated gases be delivered from the clinkering zone to the calcining zone in order to provide the heat required for the calcining operation. Hence, in spite of the fact that the clinkering reaction itself requires little or no heat, it is necessary that considerable heat and a high temperature radiant flame be maintained in the clinkering zone in order to compensate for heat losses due to radiation and to absorption of heat by the gases which are heated in the clinkering zone to supply the heat necessary for the drying and calcining of the raw materials.

In operating under these conditions I have observed that the temperature conditions maintained in the clinkering zone produces a superheating of the clinker, resulting in a change in the molecular, crystalline, or physical state of the clinker which is quite different from that produced when the clinkering operation is carried out by the application of only sufficient heat to permit the clinkering reaction to proceed to completion. I have further discovered that this superheating is caused or brought about by the powerful radiant flames which are required for the protection of the high temperature clinkering zone and for the production of the enormous quantities of heated gases which must be transported from the clinkering to the drying and calcining zones.

I have also discovered that the change in the molecular, crystalline or physical state of the clinker due to the aforesaid superheating represents a storage of potential heat energy within the clinker which, when reclaimed and returned to the clinkering zone in accordance with this invention, enables the requisite temperatures in said zone to be achieved with less fuel than is now required. I have found, for example, that if the clinker, as it comes from the clinkering zone, is immediately subjected to the rapid cooling action of a blast of cold air the latter is heated, by what may be termed the "recalescence" action of the clinker, to a temperature ranging from 200° C. to 300° C. above the temperature at which the clinker is discharged from the kiln. By immediately passing this heated air to the clinkering zone I have found it possible to obtain perfect combustion at a very high intensity with considerably less fuel than is ordinarily required for this purpose.

I have also discovered that the so-called "recalescence" action of the clinker reaches its greatest intensity when the clinker is subjected to the aforesaid rapid air cooling while at the maximum clinkering temperature. Based on this discovery I have found that it is desirable to operate the kiln so that the clinkering zone is brought up to the discharge lip of the kiln. This eliminates that zone of the kiln (commonly called the cooling zone) which, in normal operation, lies between the clinkering zone and the discharge lip of the kiln. Elimination of this cooling zone enables the clinker to be discharged from the kiln at the maximum clinkering temperature into the path of a current or blast of cold air by which the recalescence action of the clinker is developed. It may also be pointed out that, when the clinkering zone is shortened and shifted up to the discharge lip of the kiln, there is a corresponding gain in the length of the zone available for calcining and in the general capacity and efficiency of the kiln. Furthermore, when the clinkering zone is shifted close to the lip of the kiln, the amount of heat radiated from the hood is increased and utilized to better advantage for steadying the flame of the burner and maintaining the requisite high temperature at the point where the clinker is discharged.

In practice the shortening and shifting of the clinkering zone toward the discharge lip or hood of the kiln is effected by regulating the feed of the raw materials and the rotation of the kiln in conjunction with appropriate adjustment of the draft and firing conditions.

In the practical application of this invention it is important, in order to avoid destruction of the kiln by excessively high temperatures, that the air which is heated by the recalescence action of the clinker be conducted to the clinkering zone without coming in contact with the outer surface of the kiln. It is also desirable that the rapid air cooling by which the recalescence action of the clinker is developed should be effected in the discharge chute of the kiln and as close as possible to the discharge lip.

As a further improvement the present invention contemplates a novel arrangement of burners including at least one burner whose main function is to maintain and protect the clinkering reaction with the least possible expenditure of heat and at least one additional burner whose main function is to produce the volume of heat necessary for the calcining operation and to take care of the varying requirements of the calcining zone in such manner as to prevent interference with the clinkering reaction and with the general efficiency of the kiln.

The foregoing and other features of this invention will be more readily understood from the following description of the accompanying drawing, in which the single figure is a diagrammatic view of a rotary kiln installation by which the invention may be reduced to practice.

Referring more particularly to the drawing, 5 designates a rotary kiln inclined in the usual manner so that, during rotation of the kiln, the raw materials introduced into the upper end are gradually fed to the lower end or discharge lip. So far as the present invention is concerned the important point to be noted in connection with the introduction of the raw materials and the rotation of the kiln is that both should be closely regulated so that the rate of advance of the raw materials through the kiln and the heat transfer which takes place between such materials and the heated gases is such that, with appropriate adjustment of the draft and firing conditions, the clinkering zone may be confined to a relatively short section of the kiln immediately adjacent the discharge end or lip. The location of the point at which calcination is completed and clinkering begins is dependent, to some extent, upon the heat transfer between the heated gases and the mass of material moving through the kiln. This, in turn, is dependent upon the thickness of the mass which may be controlled by regulating the loading of the kiln and the speed at which the kiln is rotated. Hence, by close regulation of both the loading and the speed of rotation it is possible to operate the kiln so that, with appropriate adjustment of the draft and firing conditions, the line of demarcation between the calcining and clinkering reactions is made fairly definite and may be so located as to provide the desired short clinkering zone adjacent the discharge end. This location of the clinkering zone is an important factor of the present invention since it eliminates the cooling zone which normally lies between the clinkering zone and the discharge lip of the kiln and thus ensures that the clinker will be at the maximum clinkering temperature as it passes from the kiln into the clinker discharge conduit 6 of the hood 7 provided at the lower end of the kiln.

The hood 7 is provided with openings 8 and 9 for the passage of upper and lower burner tubes 10 and 11. Air and fuel are introduced through the lower burner tube 11 and burned to provide a short luminous flame which serves mainly to maintain and protect the clinkering reaction by providing sufficient heat to compensate for heat losses due to radiation and to absorption of heat by the gases supplied to the calcining zone. It is contemplated that, in practice, suitable regulating means well known in the art will be employed for regulating the characteristics of this flame to maintain clinkering condition as constant as possible during operation of the kiln. Fuel and air are similarly introduced through the upper tube 10 and burned to provide an upper flame which assists the lower flame in producing the heat and products of combustion required to carry on the calcining reactions. It is also contemplated that, in practice, suitable means well known in the art will be provided for regulating the upper flame to increase or decrease the firing intensity to take care of variations in the calcining operation without disturbing the lower flame. The fuel supplied to the burners 10 and 11 is preferably oil or gas but this is not essential since pulverized coal may also be used. It is also pointed out that, instead of the arrangement shown, I may provide a plurality of lower burners 11 and a plurality of upper burners 10 to provide a wider range of control with respect to adjustment of the firing conditions.

While it is important to this invention that the firing zone be located adjacent the discharge end of the kiln by regulating such operation conditions as the loading and rotation of the kiln and the firing and draft conditions, I have not considered it necessary to show or describe specific means for this purpose since such means are well known in the art.

I do not claim that it is new to operate the kiln so that the clinkering zone is located immediately adjacent the discharge end but I do claim that it is new to do this for the purpose of the present invention, namely to ensure that the clinker will be at the maximum clinkering temperature when subjected to the rapid air cooling by which the recalescence action of the clinker is developed as hereinafter described.

As clearly indicated on the drawing, the hot clinker discharged from the kiln 5 drops through the conduit 6 onto a travelling grate 13 enclosed within a suitable housing 14 which is in communication with the conduit 6 and the receiving end of a suitable clinker cooler 17. The grate 13 is preferably made of metal of high heat resisting characteristics and is shown diagrammatically as consisting of pivoted slats 18 supported between endless flexible carriers 19 which are trained over suitable sprockets 20 and 21, the latter being driven by a suitable drive mechanism (not shown) located outside the casing 14. The grate 13 is inclined as shown and is driven in the direction indicated by the arrow to deliver the clinker deposited thereon into the cooler 17, after most of the latent heat energy stored in the clinker has been liberated and utilized for heating the combustion supporting air as hereinafter described. The grate 13 is extended into the back portion 14a of the casing 14 where it is cooled by cold air which is forced inwardly through the opening 23 by any suitable type of fan or blower. The air thus supplied through opening 23 may be either normal atmospheric air or air short circuited from the cooler 17, or may be a mixture of both dependent upon operating conditions. This air rises through the space between the slats of the grate 13 and through the clinker discharge conduit 6 and is thus brought into contact with the clinker while it is still at the maximum clinkering temperature. The air is thus heated intensely by what has already been described as the "recalescence" action of the clinker and passes from the conduit 6 into the clinkering zone where it serves as combustion supporting air and enables the requisite heat and temperature conditions to be maintained in the clinkering and calcining zones with considerably less expenditure of fuel than would otherwise be required.

In addition to delivering the clinker to the cooler 17 the grate 13 provides a surface on which the clinker is spread to facilitate intimate contact between the clinker and the air by which the clinker is rapidly cooled to develop the so-called "recalescence" action of the clinker. In practice the grate 13 should be located as close to the discharge lip of the kiln as is practicable so that the recalescence action of the clinker will be initiated as soon as possible after the discharge of the clinker from the kiln. It is also important to prevent contact of the clinker heated air with the unprotected outer surface of the lower portion of the kiln since, in view of the high temperature of the air and the high temperature existing within the clinkering zone, such contact between the clinker heated air and the kiln would result in destruction of the latter. According to the present invention this is taken care of by reason of the fact that the housing 14 and the walls of the clinker discharge conduit 6 prevent any contact between the outer surface of the kiln and the clinker heated air as the latter flows toward the clinkering zone.

In practice I have found that, in operating under the conditions described herein, the rapid passage of cold air from the inlet 23 to the conduit 6 in countercurrent contact with the hot clinker results in the air being heated to a temperature which is from 200° C. to 300° C. above the temperature at which the clinker is discharged from the kiln.

As it passes to the clinkering zone of the kiln this highly preheated air mixes with and raises the temperature of the air which is supplied to the conduit 6 from the cooler 17. It will thus be seen that a large volume of combustion supporting air is supplied to the clinkering zone at a sufficiently high temperature to enable the kiln to be successfully operated with considerably less fuel than is ordinarily required to maintain the required temperature and heat conditions in the clinkering and calcining zones.

Having thus described my invention, what I claim is:

1. In the method for burning fuel for processing cement in a kiln having an inlet end for the material to be treated and a discharge end for the material treated, the steps of so regulating the operating conditions as to provide a clinkering zone adjacent to and terminating at the discharge end of the kiln, discharging the clinkers from the kiln directly from the clinkering zone at their maximum temperature before cooling, and concomitantly with the discharge of the clinkers from the clinkering zone subjecting them to a rapidly moving countercurrent blast of cold air sufficient to rapidly and suddenly shock the clinkers while still at their maximum temperature and thereby set up a recalescent action of the clinkers for initially removing excessive potential energy therefrom and heating said countercurrent blast of air to a temperature substantially above the maximum temperature of the clinkers as they are discharged from the clinkering zone and then directly and immediately passing said countercurrent blast of air at said elevated temperature directly into the clinkering zone of the kiln for producing combustion in the kiln and thereby materially reducing the fuel consumption.

2. The method of burning cement in a rotary kiln which comprises the steps of introducing raw material into the upper end of the kiln and regulating the heat transfer, rate of feed, speed of rotation of the kiln, so as to provide a relatively long calcining zone in the kiln where the raw material is calcined largely by endothermic reaction and a relatively short clinkering zone forming a continuation thereof and terminating at the discharge end of the kiln where the clinkering reaction takes place, then discharging the clinkers from the kiln directly from the clinkering zone while still at their maximum temperature before cooling and concomitantly with the discharge of the clinkers from said zone subjecting the clinkers to a rapidly moving countercurrent blast of cold air sufficient for rapidly and suddenly shocking the clinkers while still at their maximum temperature to set up a recalescent action and thereby heat said stream of air to a temperature substantially above the maximum temperature of the clinkers as they are discharged from the clinkering zone, then directly and immediately passing said countercurrent stream of air at said elevated temperature directly into the clinkering zone of the kiln for producing combustion in the kiln.

3. The method of burning cement in a rotary kiln comprising in combination the steps of regulating the operating conditions so as to provide a relatively long calcining zone in the kiln merging directly into a relatively short clinkering zone immediately adjacent the discharge end of the kiln, discharging the clinkers from the kiln directly from the clinkering zone while at their maximum temperature before passing through a cooling zone and concomitantly with said discharge of the clinkers from said zone subjecting them to a rapidly moving countercurrent blast of cold air sufficient to rapidly and suddenly shock the clinkers while still at their maximum temperature to set up a recalescent action and thereby heat said stream by the sudden liberation of potential energy from the clinkers to a temperature of the order of 200° C. and up above the maximum temperature at which the clinkers are concomitantly discharged from the kiln, then directly and immediately passing said countercurrent stream of air at said elevated temperature countercurrent to the stream of clinkers directly into the discharge end of the clinkering zone substantially as and for the purpose set forth.

DONALD L. DERROM.